(12) United States Patent
Jin et al.

(10) Patent No.: US 12,458,492 B2
(45) Date of Patent: Nov. 4, 2025

(54) PRESETTABLE ARTIFICIAL BIOLOGICAL AORTIC VALVE

(71) Applicant: BEIJING BALANCE MEDICAL TECHNOLOGY CO., LTD., Beijing (CN)

(72) Inventors: Lei Jin, Beijing (CN); Chengxiong Gu, Beijing (CN); Jiangang Wang, Beijing (CN); Zhihao Fan, Beijing (CN); Tiegang Liu, Beijing (CN); Jia Wu, Beijing (CN)

(73) Assignee: BEIJING BALANCE MEDICAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/837,850

(22) PCT Filed: Feb. 15, 2023

(86) PCT No.: PCT/CN2023/076285
§ 371 (c)(1),
(2) Date: Aug. 12, 2024

(87) PCT Pub. No.: WO2023/155818
PCT Pub. Date: Aug. 24, 2023

(65) Prior Publication Data
US 2025/0161031 A1    May 22, 2025

(30) Foreign Application Priority Data
Feb. 15, 2022 (CN) .......................... 202210137514.6

(51) Int. Cl.
*A61F 2/24* (2006.01)
(52) U.S. Cl.
CPC .......... *A61F 2/2418* (2013.01); *A61F 2/2433* (2013.01); *A61F 2210/0009* (2013.01);
(Continued)

(58) Field of Classification Search
CPC .................. A61F 2/2418; A61F 2/2409; A61F 2220/0033; A61F 2220/0075
See application file for complete search history.

(56) References Cited

U.S. PATENT DOCUMENTS

| | | | |
|---|---|---|---|
| 4,816,029 A | * | 3/1989 | Penny, III ............. A61F 2/2409 623/2.19 |
| 5,549,665 A | * | 8/1996 | Vesely .................. A61F 2/2409 623/2.14 |

(Continued)

FOREIGN PATENT DOCUMENTS

| | | |
|---|---|---|
| CN | 103961192 A | 8/2014 |
| CN | 204581600 U | 8/2015 |

(Continued)

OTHER PUBLICATIONS

English translation of P.237 written opinion dated Aug. 12, 2024 (Year: 2024).*

(Continued)

*Primary Examiner* — Suzette J Gherbi
(74) *Attorney, Agent, or Firm* — Outlier Patent Attorneys, PLLC

(57) ABSTRACT

The present invention discloses a presettable artificial biological aortic valve which comprises a valve seat (1), a valve leaflet stent (2) and three valve leaflets (3), wherein the valve seat (1) is a one-way limiting expandable annular metal seat; the head end of each seat body unit (4) is sequentially provided with a first rivet (7), a limiting protrusion (6) and a first long circular groove (5) from the outside to the inside; the tail end of each seat body unit (4) is sequentially provided with a second long circular groove (8), a second limiting hole (10) and a first limiting hole (9) matched with the limiting protrusion (6), and a second rivet (11) matched with the first long circular groove (5). The presettable (Continued)

artificial biological aortic valve has an original preset state and a normal use state after one-way limiting expansion.

11 Claims, 5 Drawing Sheets

(52) U.S. Cl.
CPC .............. *A61F 2210/0014* (2013.01); *A61F 2220/0041* (2013.01)

(56) References Cited

U.S. PATENT DOCUMENTS

| | | | |
|---|---|---|---|
| 6,569,196 B1 * | 5/2003 | Vesely | A61F 2/243 623/2.14 |
| 9,364,322 B2 * | 6/2016 | Conklin | A61F 2/2409 |
| 2019/0321170 A1 | 10/2019 | Green et al. | |

FOREIGN PATENT DOCUMENTS

| | | |
|---|---|---|
| CN | 104884001 A | 9/2015 |
| CN | 108135699 A | 6/2018 |
| CN | 210541937 U | 5/2020 |

OTHER PUBLICATIONS

First office action dated Aug. 5, 2023 of Chinese patent application No. 202310116885.0, which claims priority to CN 202210137514.6.

International Search Report of PCT/CN2023/076285 dated May 31, 2023.

Second office action dated Nov. 29, 2023 of Chinese patent application No. 202310116885.0, which claims priority to CN 202210137514.6.

* cited by examiner

PRESETTABLE ARTIFICIAL BIOLOGICAL AORTIC VALVE

CROSS-REFERENCE TO RELATED APPLICATIONS

This application is a United States National Stage Application filed under 35 U.S.C 371 of PCT Patent Application No. PCT/CN2023/076285, filed Feb. 15, 2023, which claims the priority benefit of Chinese Patent Application No. CN 202210137514.6, filed Feb. 15, 2022, the disclosure of all of which are hereby incorporated by reference in their entirety.

TECHNICAL FIELD

The present invention relates to an artificial biological valve, in particular to a presettable artificial biological aortic valve.

BACKGROUND ART

With the deep development of valve surgery, aortic valve replacement (AVR) suffers from the problem of narrow valve annulus or narrow aortic root, which is increasingly important, in AVR patients with congenital heart disease or rheumatic heart disease mainly characterized by stenosis, those with small size or excessive weight, those with valve annulus stenosis or concomitant left ventricular outflow tract stenosis or aortic root (sinus canal junction—annulus—outflow tract) dysplasia, due to the local anatomical conditions of the aortic root, it is often not possible to place artificial valve of sufficient caliber. The use of small-sized artificial valve prostheses during surgery can lead to high cross valve pressure difference, inability to improve hemodynamics, and increased left ventricular afterload in patients. This not only affects the recovery of heart function, but also affects long-term quality of life and survival rate, and accelerates the decline of biological valves.

Due to the smaller body size of domestic patients compared to the Western population, the mismatch between artificial valve and patients (PPM) is particularly severe in China. According to the data from 93 large centers in China's cardiac surgery registration system, nearly 50% of surgical AVR patients implant small-sized artificial valve with a size not exceeding 21. Therefore, domestic cardiac surgeons have to first try to expand the valve annulus through surgery before AVR. Expanding the valve annulus or aortic root is an effective method to solve small aortic rings, but it requires high surgical skills from the operator, often leading to postoperative complications and even patient death. In fact, some patients who are older or have contraindications for anticoagulation should be suitable for using biological valves, but due to concerns about the small size of the aortic valve annulus, they have to choose mechanical valves of the same model.

In addition, in recent years, with the research and application of interventional valve-in-valve, it has become a reality to input an interventional artificial biological valve through a catheter into a previously implanted and damaged biological valve, so that these patients can receive treatment without the risk of undergoing another surgery to replace the valve. However, due to the small size of the previously implanted damaged valve, such as No. 21 or No. 19, it is difficult to perform interventional valve-in-valve treatment due to the limitation of the valve orifice diameter. Even with the intervention of smaller models of valve-in-valve, the postoperative cross valve pressure difference is high, and its durability will be significantly affected. There is currently no satisfactory solution proposed in the industry.

SUMMARY

In view of this, the present invention can provide a presettable artificial biological aortic valve, which has an initial preset state, and its appearance is smaller than that of a previously surgically implanted artificial biological heart valve by a model, and after the surgical implantation is completed, it can be rotated in one direction by balloon compression, and limit and expand the inner diameter of the valve orifice of 1 or 1.5 models, thereby avoiding the risk of PPM and obtaining a better treatment effect.

In order to solve the above technical problem, the technical means adopted by the present invention is: a presettable artificial biological aortic valve, comprising a valve seat, a valve leaflet stent and three valve leaflets attached to the valve leaflet stent, wherein the valve seat is a one-way limiting expandable annular metal seat, the annular metal seat is composed of three sections of seat body units connected with each other in a staggered manner from the head end to the tail end in inside and outside, the head end of each seat body unit is sequentially provided with a first rivet, a limiting protrusion and a first long circular groove from the outside to the inside, the tail end of each seat body unit is sequentially provided with a second long circular groove matched with the first rivet at the head end of the adjacent seat body unit, a second limiting hole and a first limiting hole matched with the limiting protrusion respectively, and a second rivet matched with the first long circular groove, the first long circular groove of each seat body unit is matched with the second rivet of the adjacent seat body unit and can move in one direction, the second long circular groove of each seat body unit is matched with the first rivet of the adjacent seat body unit and can move in one direction, the limiting protrusion of each seat body unit is matched with first limiting hole and the second limiting hole of the adjacent seat body unit respectively and can move in one direction, the middle part of each seat body unit is provided with a wavy protrusion, the presettable artificial biological aortic valve has a preset original state and a normal use state after one-way limiting and expanding, and each seat body unit forms the normal use state as the existing surgical biological aortic valve Among them, the seat body unit of each valve is expanded by no less than 5 atmospheres (atm) balloon to enable the valve seats to synchronously rotate in one direction and expand outwards to form the one-way limiting expandable state; and the valve leaflet stent has a preset state and a normal application state, the preset state is matched with the valve seats before expansion, and the normal function state is matched with the valve seats after expansion. Each seat body unit has the same structure, and the head end of each seat body unit is disposed inside the tail end of the adjacent seat body unit. The limiting protrusion has an upwardly inclined semicircular protrusion along the expansion direction, a head of the protrusion along the expansion direction is a round head, forward sliding resistance is stabilized, a tail of the protrusion is a flat head protrusion, and reverse sliding is prevented after sliding into the limiting hole. The limiting hole has a shape matched with the limiting protrusion. When the limiting protrusions on the valve seat are respectively located at two positions before and after the valve seat is expanded, the valve frame corresponds to two shapes before and after expansion, and the expanded shape is a normal use shape. The valve leaflet stent has a preset shape and a normal use shape, and the normal use shape is matched with a normal use state of the presettable artificial biological aortic valve after one-way limiting expansion. The specifications of the three valve leaflets is matched with a normal use state after one-way limiting expansion. The outer side of the valve seat is coated with a supporting belt made of a polymeric material, and the supporting belt is matched with a normal use state of the aortic valve after one-way limiting expansion. The valve leaflet is modified bovine pericardium, porcine pericardium, porcine aortic valve, flaky animal tissue or non-biosynthetic valve leaflet material. The valve portion composed of the three valve leaflets allows one-way blood flow through the valve portion when the valve portion is in the normal use state after the one-way limiting expansion. The valve seat and the valve leaflet stent are made of Elgiloy alloy, cobalt-chromium alloy, nickel-titanium alloy and implantable stainless steel (316L, cobalt-chromium-nickel-molybdenum-iron alloy). Before the valve is in the one-way limiting expansion state, an original preset state is an abnormal use state, except that a valve effect of one-way blood flow can be implemented when the valve is in the one-way limiting expansion state through a balloon external force to a normal use state same as that of an existing surgical artificial biological aortic valve.

The present invention relates to a presettable artificial biological aortic valve prosthesis. Which is characterized in that, the one-way limiting expandable artificial heart valve has two states, the first state of this product is a preset state, and the implanted outer diameter size of the product is similar in appearance to the previously marketed nominal artificial biological heart valve products, but smaller in size 1 or 1.5 model; this model is the valve model corresponding to the size of the valve annulus, the valve in this state cannot be used normally and are not in the working state of the valve. When the product is implanted into the patient's smaller aortic valve annulus or smaller aortic root, the external force of the stamping balloon causes the product to undergo one-way limiting and expansion, entering a second state that can be used normally, that is, the shape, structure, and performance of the product are completely the same as those of the artificial biological heart valve already listed in the enterprise, except for the expansion of specification 1 or 1.5 model, and in this state, the valve is in a complete and normal functional state. From this, it can be seen that this process allows patients who were originally unable to implant artificial biological valves due to the small size of the aortic valve annulus or were concerned about valve size mismatch (PPM) to implant a small valve annulus and valve first, and then expand the valve annulus through balloon dilation, achieving the final effect and purpose of implanting a larger size valve. The main meaning of "preset" is to first implant a smaller size non normal valve and then expand it. The dilation of the valve annulus not only brings benefits to the treatment of the valve itself (such as reduced cross valve pressure), but also provides the possibility for patients undergoing surgical valve replacement at the small aortic root who may need to undergo interventional valve-in-valve treatment in the future.

DETAILED DESCRIPTION

Figure 1:
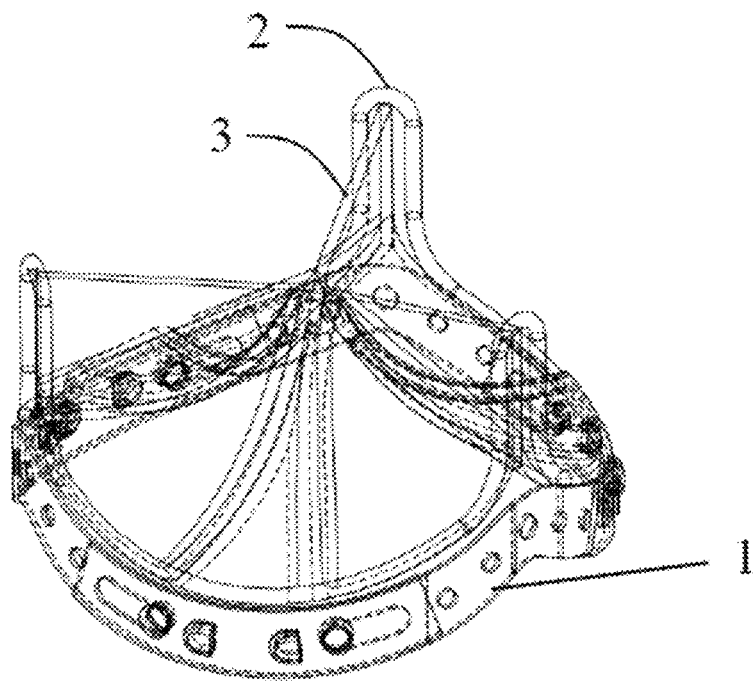
FIG. 1 is a perspective schematic diagram of a presettable artificial biological aortic valve body according to an example of the present application.
Figure 2:
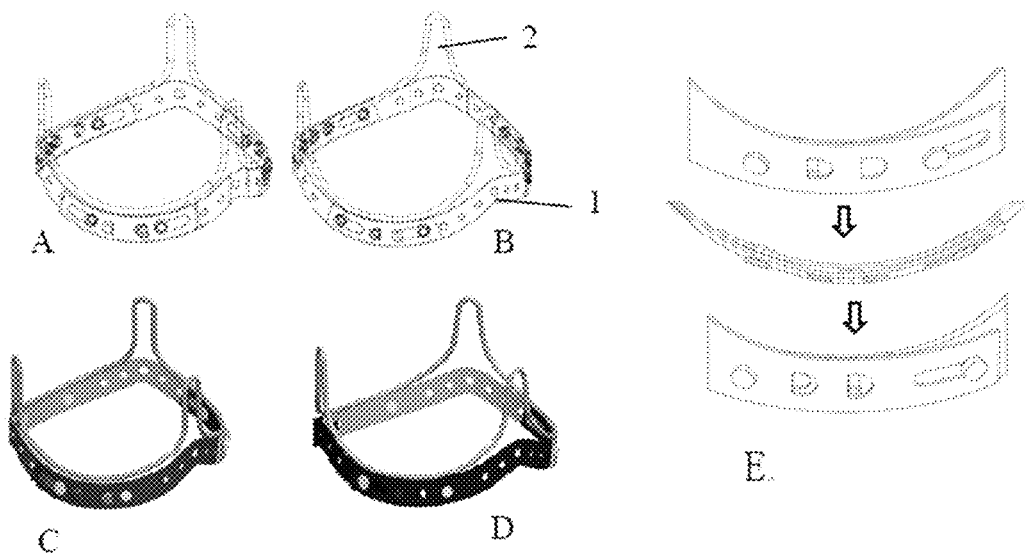
FIGS. 2A-E are schematic diagrams of an original state and an expanded state of the valve seat in FIG. 1.
Figure 3:
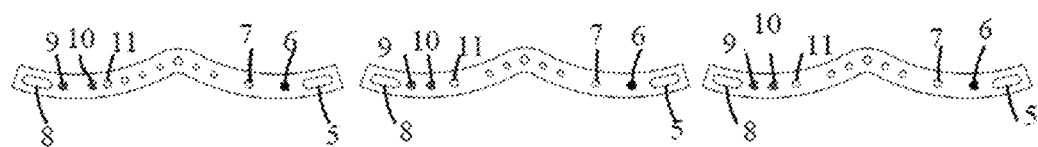
FIG. 3 is an exploded view of three seat body units of the valve seat of FIG. 1.
Figure 4:
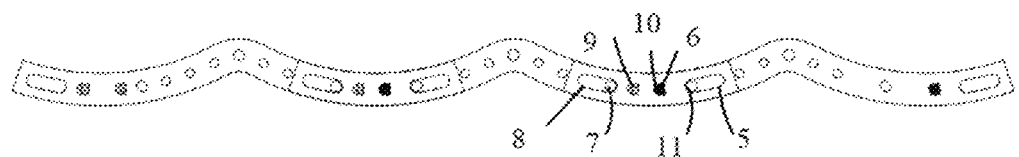
FIG. 4 is an expanded schematic diagram of an original state after three seat body units of the valve seat in FIG. 1 are combined.
Figure 5:
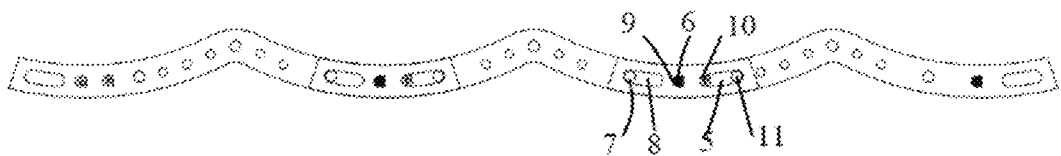
FIG. 5 is an expanded view of three seat body units of the valve seat of FIG. 1 after being combined.

The present invention will be further described in detail below with reference to the accompanying drawings and examples. It should be understood that the specific examples described herein are merely used to explain the present invention, and are not intended to limit the present invention.

As shown in FIGS. 1-7, a presettable artificial biological aortic valve according to an example of the present disclosure includes a valve seat 1, a valve leaflet stent 2 and three valve leaflets 3 attached to the valve leaflet stent, the valve seat is a one-way limiting expandable annular metal seat, the annular metal seat is composed of three sections of seat body units 4 connected with each other in a staggered manner from the head end to the tail end in inside and outside, the head end of each seat body unit is sequentially provided with a first rivet 7, a limiting protrusion 6 and a first long circular groove 5 from the outside to the inside, the tail end of each seat body unit is sequentially provided with a second long circular groove 8, a first limiting hole 9, a second limiting hole 10 and a second rivet 11, the first long circular groove 5 of each seat body unit 4 is matched with the second rivet 11 of an adjacent seat body unit and can move in one direction, the second long circular groove 8 of each seat body unit is matched with the first rivet 7 of the adjacent seat body unit and can move in one direction, the semicircular limiting protrusion 6 of each seat body unit is matched with the semicircular first limiting hole 9 and the semicircular second limiting hole 10 of the adjacent seat body unit respectively and can move in one direction, and the middle of each seat body unit is provided with a wavy protrusion. In the original state, the limiting protrusion 6 is first positioned in the second limiting hole 10, and after one-way limiting expansion, the limiting protrusion 6 is moved in one direction into the first limiting hole 9 and positioned therein. The limiting protrusion is provided with an upward inclined semicircular protrusion along the expansion direction, the head of the protrusion along the expansion direction is a round head, forward sliding resistance is inhibited, the tail is a flat head protrusion, and reverse sliding is prevented after sliding into the limiting hole. The limiting hole has a shape matched with the limiting protrusion. When the limiting protrusions on the valve seat are respectively located at two positions before and after the valve seat is expanded, the valve frame corresponds to two shapes before and after expansion, and the expanded shape is a normal use shape. The presettable artificial biological aortic valve has a preset original state and a normal use state after one-way limiting expansion, and each seat body unit forms the normal use state same as that of the existing surgical biological aortic valve after synchronous one-way rotation and outward expansion, as shown in FIG. 2A and FIG. 2C which are original states, and in FIG. 2B and FIG. 2D which are expanded states. It should be noted that, the setting of the long circular groove and the rivet is not fixed and can be changed according to the needs, as long as the long circular groove and the rivet can cooperate with each other for one-way rotary expansion movement.

Figure 6:
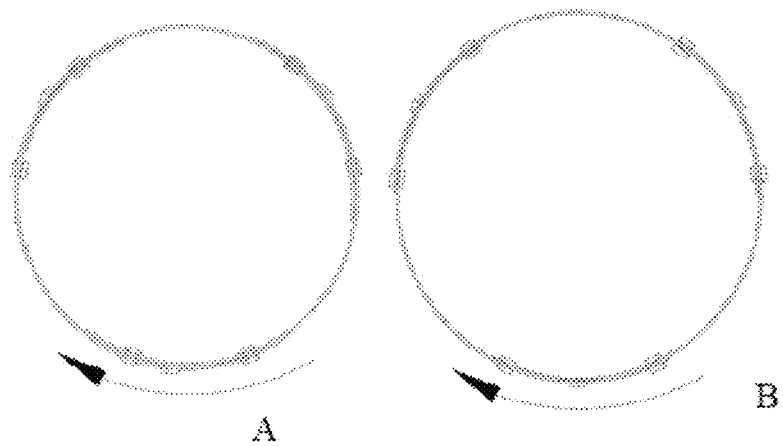
FIGS. 6A-B are schematic diagrams of one-way movement of the valve seat and limiting expansion of the diameter of the valve seat.
Figure 7:
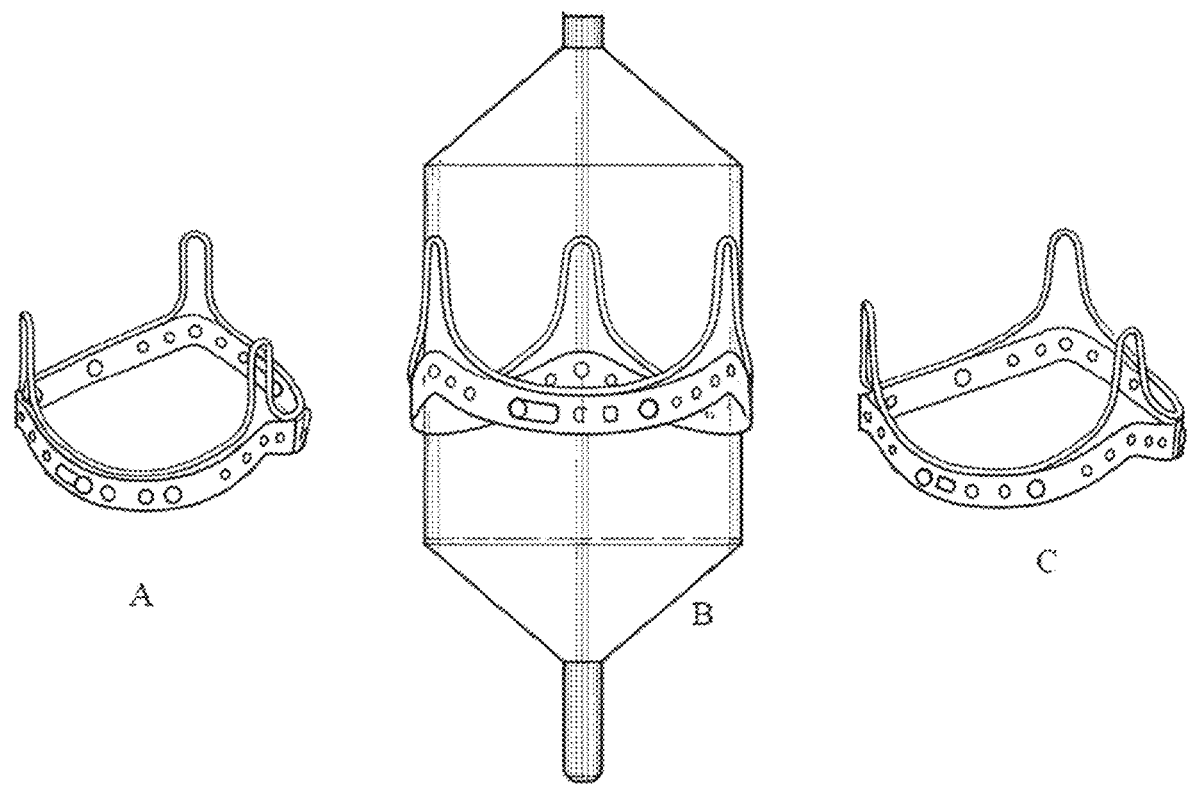
FIGS. 7A-C are schematic diagrams of an initial preset state of an artificial biological aortic valve and a normal use state in which the artificial biological aortic valve can be expanded in one direction by an external force of an interventional balloon according to the present application.

As shown in FIG. 6 and FIG. 7, the seat body unit of each valve is expanded by no less than 5 atmospheres (atm) balloon to enable the valve seats to synchronously rotate in one direction and expand outwards to form the one-way limiting expandable state; and the valve leaflet stent has a preset state and a normal application state, the preset state is matched with the valve seats before expansion, and the normal function state is matched with the valve seats after expansion. Each seat body unit has the same structure, and the head end of each seat body unit is disposed inside the tail end of the adjacent seat body unit. The limiting protrusion is a semicircular protrusion inclined upward along the expansion direction, and the limiting hole has a shape matched with the limiting protrusion. The head of the limiting protrusion in the expansion direction is a round head, forward sliding resistance is stabilized, the tail is a flat head protrusion, and reverse sliding is prevented after sliding into the limiting hole. The limiting hole has a shape matched with the limiting protrusion, when the limiting protrusion on the valve seat is located at two positions before and after the valve seat is expanded, the valve frame corresponds to the two shapes before and after expansion, the expanded shape is a normal use shape, and the lengths of the first and second long circular grooves are consistent with the distance between the two limiting holes. The valve leaflet stent has a preset shape and a normal use shape, and the normal use shape is matched with a normal use state after one-way limiting expansion of the presettable artificial biological aortic valve. The specifications of the three valve leaflets is matched with a normal use state after one-way limiting expansion. The outer side of the valve seat is coated with a supporting belt made of a polymeric material, and the supporting belt is matched with a normal use state of the aortic valve after one-way limiting expansion. The valve leaflet is modified bovine pericardium, porcine pericardium, porcine aortic valve, flaky animal tissue or non-biosynthetic valve leaflet material. The valve portion composed of the three valve leaflets allows one-way blood flow through the valve portion when the valve portion is in the normal use state after the one-way limiting expansion. The valve seat and the valve leaflet stent are made of Elgiloy alloy, cobalt-chromium alloy, nickel-titanium alloy and implantable stainless steel (316L, cobalt-chromium-nickel-molybdenum-iron alloy). The above coated outer layer materials are conventional techniques in the art and are not shown in the drawings. Before the valve is in the one-way limiting expansion state, an original preset state is an abnormal use state, except that a valve effect of one-way blood flow can be implemented when the valve is in the one-way limiting expansion state through a balloon external force to a normal use state same as that of an existing surgical artificial biological aortic valve.

In-Vitro Verification

The present invention relates to a presettable artificial biological aortic valve, characterized by an initial preset state and a normal use state that can be one-way expanded by external force of an interventional balloon, as shown in FIG. 7. An in-vitro test uses a balloon expanded by a common intervention ball, when the inflation pressure reaches 5 atmospheres, an aortic valve can be preset to be one-way expanded from an initial preset state, the internal diameter of the aortic valve is increased by one model to be in a normal use state, the artificial biological aortic valve on the market of a company is used for contrast, and the appearance of the aortic valve is completely the same as the fluid mechanical performance of the aortic valve on the basis of the appearance limit measurement or the in-vitro fluid mechanics test.

In-Vivo Verification

Figure 8:
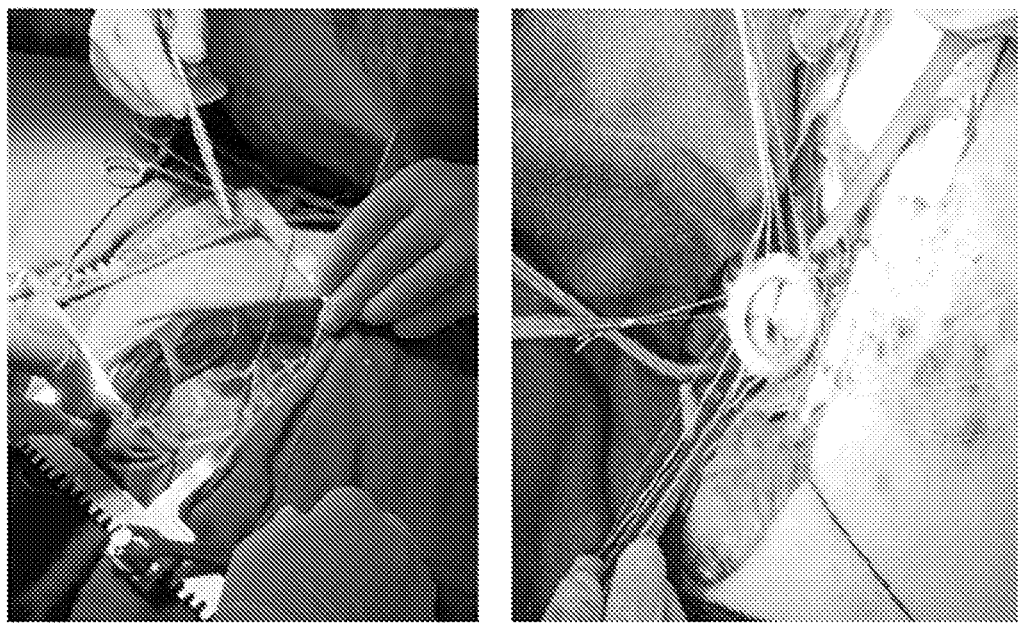
FIGS. 8A-B are schematic diagrams of predictable artificial biological aortic valve surgical implantation according to an example of the present invention.
Figure 9:
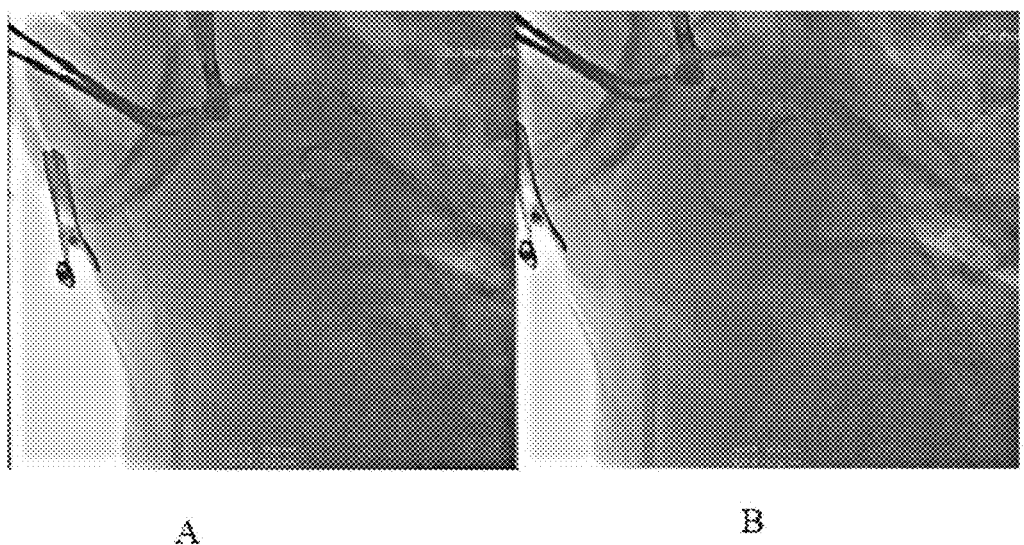
FIGS. 9A-B are schematic diagrams of accurately measuring an initial inner diameter and an inner diameter after one-way expansion of a preset aortic valve by DSA contrast.

Adult sheep is used as an experimental animal, and a presettable artificial biological aortic valve is implanted in situ under extracorporeal circulation. No. 19, No. 21 and No. 23 were surgically implanted, respectively, as shown in FIGS. 8 and 9. Measure the valve outer diameter using DSA before expansion, and then insert the company's balloon to expand the valve and insert the balloon, pressurize to 5.0-5.5 atmospheres, maintain for 5 seconds, and then withdraw the pressure. After withdrawing the balloon, care should be taken to close the chest and suture the skin to complete the surgery.

The internal diameter of the implanted and expanded preset aortic valve is accurately measured by DSA contrast, as shown in FIG. 9, the cross valve pressure difference, the effective opening area and the backflow condition of the valve are then subjected to esophageal ultrasonic detection, and compared with the artificial biological aortic valve on market of the company, the normal working state of the one-way expanded preset artificial biological aortic valve is completely the same as the opening and closing function of the large first number of the available artificial biological aortic valves.

According to the animal experiment, 3 models are completed in total, one-way expansion of the preset aortic valve is achieved through the same balloon expansion pressure, the preset aortic valve is converted into a normal use state from an initial state, valve regurgitation is not seen through esophageal ultrasonic examination, and the inner diameter and the effective opening area of the preset aortic valve are the same as those of a first number of normal artificial biological aortic valves.

The design of the preset aortic valve can provide patients with narrow annulus or narrow aortic root who require surgical valve replacement, with a valve with a smaller outer diameter but a normal size of 1 or 1.5 obtained through balloon dilation, meanwhile, complications possibly occurring in the surgical operation related to root expansion can be avoided, an artificial biological valve cannot be implanted or a PPM patient cannot be implanted due to the fact that the aortic valve annulus is too small, and a preset artificial biological aortic valve with a large specification model can be implanted. At the same time, it is also possible that the patient may need to perform interventional valve-in-valve treatment in the future.

The above description is only a preferred example of the present invention and is not intended to limit the present invention, and any modifications, equivalent substitutions and improvements made within the spirit and principle of the present invention shall be included within the protection scope of the present invention.

The invention claimed is:

1. A presettable artificial biological aortic valve, comprising a valve seat, a valve leaflet stent and three valve leaflets attached to the valve leaflet stent, characterized in that, the valve seat is a one-way limiting expandable annular metal seat, the annular metal seat is composed of three sections of seat body units connected with each other in a staggered manner from the head end to the tail end in inside and outside, the head end of each seat body unit is sequentially provided with a first rivet, a limiting protrusion and a first long circular groove from the outside to the inside, the tail end of each seat body unit is sequentially provided with a second long circular groove matched with the first rivet at the head end of the adjacent seat body unit, a second limiting hole and a first limiting hole matched with the limiting protrusion respectively, and a second rivet matched with the first long circular groove, the first long circular groove of each seat body unit is matched with the second rivet of the adjacent seat body unit and can move in one direction, the second long circular groove of each seat body unit is matched with the first rivet of the adjacent seat body unit and can move in one direction, the limiting protrusion of each seat body unit is matched with first limiting hole and the second limiting hole of the adjacent seat body unit respectively and can move in one direction, the middle part of each seat body unit is provided with a wavy protrusion, the presettable artificial biological aortic valve has a preset original state and a normal use state after one-way limiting and expanding, and each seat body unit forms the normal use state as the existing surgical biological aortic valve, before the valve formed by the three valve leaflets is in the one-way limiting expansion state, an original preset state is an abnormal use state, except that a valve effect of one-way blood flow is implemented when the valve is in the one-way limiting expansion state through a balloon external force to a normal use state same as that of an existing surgical artificial biological aortic valve;

the limiting protrusion is a semicircular protrusion inclined upward along the expansion direction, and the limiting hole has a shape matched with the limiting protrusion.

2. The presettable artificial biological aortic valve according to claim 1, characterized in that, a head end of each seat body unit is disposed inside a tail end of an adjacent seat body unit.

3. The presettable artificial biological aortic valve according to claim 1, characterized in that, the seat body unit is expanded by no less than 5 atmospheres balloons to enable the valve seats to synchronously rotate in one direction and expand outwards to form the one-way limiting expandable state; and the valve leaflet stent has a preset state and a normal application state, the preset state is matched with the valve seats before expansion, and the normal function state is matched with the valve seats after expansion.

4. The presettable artificial biological aortic valve according to claim 1, characterized in that, a head of the limiting protrusion along the expansion direction is a round head, forward sliding resistance is stabilized, a tail of the protrusion is a flat head protrusion, and reverse sliding is prevented after sliding into the limiting hole; when the limiting protrusions on the valve seat are respectively located at two positions before and after the valve seat is expanded, the valve frame corresponds to two shapes before and after expansion, and the expanded shape is a normal use shape.

5. The presettable artificial biological aortic valve according to claim 1, characterized in that, a length of the first long circular groove, a length of the second long circular groove, and a distance between the two limiting holes are consistent.

6. The presettable artificial biological aortic valve according to claim 1, characterized in that, the valve leaflet stent has a preset shape and a normal use shape, and the normal use shape is matched with a normal use state of the presettable artificial biological aortic valve after one-way limiting expansion.

7. The presettable artificial biological aortic valve according to claim 1, characterized in that, the specifications of the three valve leaflets is matched with a normal use state after one-way limiting expansion.

8. The presettable artificial biological aortic valve according to claim 1, characterized in that, the outer side of the valve seat is coated with a supporting belt made of a polymeric material, and the supporting belt is matched with a normal use state of the aortic valve after one-way limiting expansion.

9. The presettable artificial biological aortic valve according to claim 1, characterized in that, the valve leaflet is modified bovine pericardium, porcine pericardium, porcine aortic valve, flaky animal tissue or non-biosynthetic valve leaflet material.

10. The presettable artificial biological aortic valve according to claim 1, characterized in that, the valve portion composed of the three valve leaflets allows one-way blood flow through the valve portion when the valve portion is in the normal use state after the one-way limiting expansion.

11. The presettable artificial biological aortic valve according to claim 1, characterized in that, the valve seat and the valve leaflet stent are made of Elgiloy alloy, cobalt-chromium alloy, nickel-titanium alloy and implantable stainless steel.

* * * * *